(12) United States Patent
Tasaka et al.

(10) Patent No.: US 7,990,503 B2
(45) Date of Patent: Aug. 2, 2011

(54) LIQUID CRYSTAL DISPLAY DEVICE WITH A CONTROL CAPACITANCE PORTION

(75) Inventors: Yasutoshi Tasaka, Kanagawa (JP); Masakazu Shibasaki, Mie (JP); Yohei Nakanishi, Tenri (JP); Hidefumi Yoshida, Kanagawa (JP); Tsuyoshi Kamada, Kawasaki (JP); Kazuya Ueda, Kami-machi (JP); Hideaki Tsuda, Ebina (JP)

(73) Assignee: Sharp Kabushiki Kaisha, Osaka (JP)

( * ) Notice: Subject to any disclaimer, the term of this patent is extended or adjusted under 35 U.S.C. 154(b) by 224 days.

(21) Appl. No.: 11/333,546

(22) Filed: Jan. 18, 2006
(Under 37 CFR 1.47)

(65) Prior Publication Data

US 2007/0019120 A1 Jan. 25, 2007

(30) Foreign Application Priority Data

Jan. 19, 2005 (JP) .................................. 2005-011518

(51) Int. Cl.
*G02F 1/1337* (2006.01)
(52) U.S. Cl. ........... 349/129; 349/144; 349/39; 349/110
(58) Field of Classification Search .................. 349/129, 349/38, 39, 110, 111, 144
See application file for complete search history.

(56) References Cited

U.S. PATENT DOCUMENTS

| | | | |
|---|---|---|---|
| 4,840,460 A | 6/1989 | Bernot et al. | |
| 5,126,865 A | 6/1992 | Sarma | |
| 5,309,264 A | 5/1994 | Lien et al. | |
| 6,417,900 B1 | 7/2002 | Shin et al. | |
| 6,724,452 B1 | 4/2004 | Takeda et al. | |
| 6,771,344 B2 | 8/2004 | Lyu et al. | |
| 6,879,364 B1 | 4/2005 | Sasaki et al. | |
| 6,937,311 B2 | 8/2005 | Song et al. | |
| 7,206,048 B2 * | 4/2007 | Song | 349/129 |
| 7,304,703 B1 | 12/2007 | Takeda et al. | |
| 2004/0070715 A1 | 4/2004 | Ma et al. | |
| 2005/0030439 A1 | 2/2005 | Lyu | |
| 2005/0030460 A1 | 2/2005 | Kim et al. | |
| 2006/0103800 A1 | 5/2006 | Li et al. | |

FOREIGN PATENT DOCUMENTS

| | | |
|---|---|---|
| JP | 02-000012 A | 1/1990 |
| JP | 06-102537 | 4/1994 |
| JP | 3076938 B2 | 6/2000 |
| JP | 2005-4212 | 1/2005 |
| JP | 2005-55896 | 3/2005 |

OTHER PUBLICATIONS

U.S. Appl. No. 11/333,551 filed Jan. 18, 2006; Tasaka et al.

\* cited by examiner

*Primary Examiner* — Richard H Kim
(74) *Attorney, Agent, or Firm* — Nixon & Vanderhye P.C.

(57) ABSTRACT

A liquid crystal display device includes a pair of substrates; a liquid crystal sealed between the substrates; plural pixel regions each having a first pixel electrode formed on one of the pair of substrates and a second pixel electrode separated from the first pixel electrode; a TFT having a source electrode which is electrically connected to the first pixel electrode; a control capacitance portion which has a control capacitance electrode electrically connected to the source electrode and opposed to at least part of the second pixel electrode via an insulating film, and which thereby establishes capacitive coupling between the source electrode and the second pixel electrode; linear projections formed on the other substrate; and apertures formed in the first and second pixel electrodes so as to occupy parts of overlap regions of the linear projections and the first and second pixel electrodes as viewed perpendicularly to the substrate surfaces, for controlling the positions of singular points of alignment vectors of the liquid crystal.

23 Claims, 13 Drawing Sheets

FIG. 15A
FIG. 15B
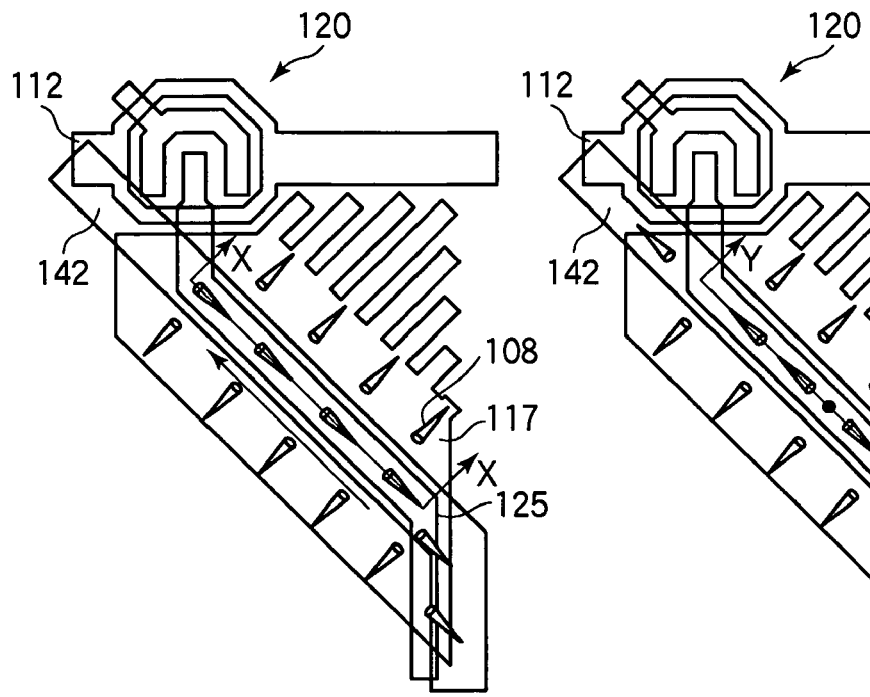
FIG. 16A
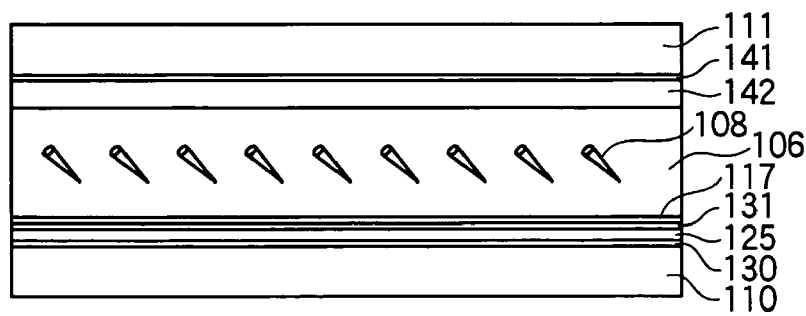
FIG. 16B
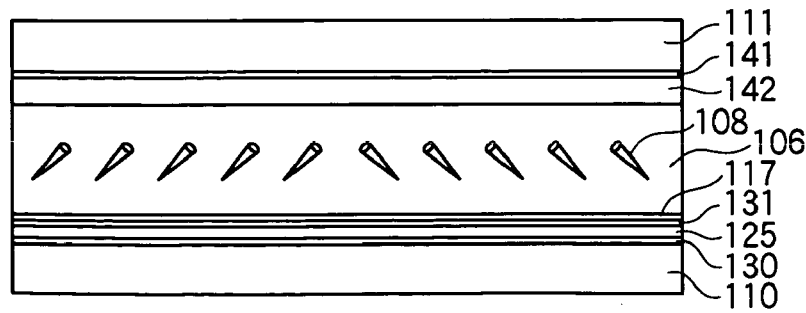

LIQUID CRYSTAL DISPLAY DEVICE WITH A CONTROL CAPACITANCE PORTION

BACKGROUND OF THE INVENTION

1. Field of the Invention

The present invention relates to a liquid crystal display device used as, for example, a display unit of an electronic apparatus.

2. Description of the Related Art

In recent years, liquid crystal display devices have come to be used for TV sets, monitor devices of personal computers, etc. In these purposes, liquid crystal display devices are required to have a superior viewing angle characteristic that the display screen is viewable from all directions.

However, VA (vertically aligned)-mode liquid crystal display devices, for example, have a problem that a transmittance vs. application voltage characteristic (T-V characteristic) obtained when the display screen is viewed from the direction perpendicular to it (i.e., front direction) is different from that obtained when the display screen is viewed from a oblique direction. More specifically, the color of an image on the display screen looks more whitish when the display screen is viewed from a oblique direction than when it is viewed from the front direction.

Liquid crystal display devices of the TN (twisted nematic) mode, which is a more conventional drive mode, have the same problem. JP-A-2-12 (Reference 1), U.S. Pat. No. 4,840,460 (Reference 2), and Japanese Patent No. 3,076,938 (Reference 3) disclose techniques for solving the above problem of TN-mode liquid crystal display devices. The pixel structure of a basic liquid crystal display device using these known techniques will be described below briefly. A pixel region is formed by, for example, two sub-pixels A and B in which separate pixel electrodes are formed, respectively. The pixel electrode of the one sub-pixel A is connected directly to the source electrode of a thin-film transistor (TFT), but the pixel electrode of the other sub-pixel B is not connected directly to the source electrode. The pixel electrode of the sub-pixel B has a region that coextends with part of a control capacitance electrode extending from the source electrode to a storage capacitor electrode with an insulating film interposed in between, and is connected indirectly to the source electrode via a control capacitance Cc formed in this region.

In the liquid crystal display device having the above pixel structure, a voltage applied to a portion of a liquid crystal layer in the sub-pixel A is different from a voltage applied to a portion of the liquid crystal layer in the sub-pixel B. As a result, distortion in the T-V characteristic is distributed in each pixel. Therefore, the phenomenon that an image looks whitish when viewed from a oblique direction is suppressed and the viewing angle characteristic is improved. This technique will be referred to below as "capacitive coupling HT (halftone/gray scale) technique."

Whereas References 1-3 describe the above techniques for TN-mode liquid crystal display devices, a more remarkable effect is obtained when the capacitive coupling HT technique is applied to liquid crystal display devices of the VA-mode which has become the mainstream mode in recent years in place of the TN mode.

FIG. 14 shows a one-pixel configuration of a conventional MVA (multi-domain vertical alignment)-type liquid crystal display device employing the capacitive coupling HT technique. As shown in FIG. 14, a TFT substrate of the liquid crystal display device has plural gate bus lines 112 formed on a glass substrate 110 (not shown in FIG. 14) and plural drain bus lines 114 formed so as to cross the gate bus lines 112 with an insulating film 130 (not shown in FIG. 14) interposed in between. Each of TFTs 120, which are formed as switching elements for the respective pixels, is disposed close to the crossing point of the associated set of a gate bus line 112 and a drain bus line 114. A gate electrode 123 of the TFT 120 is electrically connected to the associated gate bus line 112, and its drain electrode 121 is electrically connected to the associated drain bus line 114. A storage capacitor bus line 118 is formed so as to traverse a pixel region defined by the gate bus lines 112 and the drain bus lines 114 and to extend parallel with the gate bus lines 112. A storage capacitor electrode (intermediate electrode) 119 is formed above the storage capacitor bus line 118 with the insulating film 130 interposed in between (the storage capacitor electrodes 119 are provided for the respective pixels). The storage capacitor electrode 119 is electrically connected to a source electrode 122 of the TFT 120 via a control capacitance electrode 125. A storage capacitor Cs is formed between the storage capacitor bus line 118 and the storage capacitor electrode 119.

The pixel region has sub-pixels A and B. The sub-pixel A has a trapezoidal shape, for example, and is disposed at the center (in the vertical direction) closer to the left sideline in the pixel region. The sub-pixel B is disposed so as to occupy portions of the pixel region excluding the sub-pixel A, that is, a top portion, a bottom portion, and a right-hand end portion that is located at the center (in the vertical direction). Each of the sub-pixels A and B is approximately line-symmetrical with respect to the storage capacitor bus line 118. A pixel electrode 116 is formed in the sub-pixel A, and a pixel electrode 117 which is separated from the pixel electrode 116 is formed in the sub-pixel B. The pixel electrode 116 is electrically connected to the storage capacitor electrode 119 and the source electrode 122 of the TFT 120 via a contact hole 124. On the other hand, the pixel electrode 117 is in an electrically floating state. The pixel electrode 117 has a region that coextends with part of the control capacitance electrode 125 with a protective film 131 (not shown in FIG. 14) interposed in between, and the pixel electrode 117 is connected indirectly to the source electrode 122 via a control capacitance Cc formed in this region (capacitive coupling).

A linear slit (electrode-omitted portion) 144 is formed between the pixel electrodes 116 and 117 so as to extend obliquely with respect to the end lines of the pixel region. The slit 144 not only separates the pixel electrodes 116 and 117 but also functions as an alignment restriction structure for restricting the alignment of a liquid crystal 106 (not shown in FIG. 14).

A counter substrate, which is opposed to the TFT substrate via the liquid crystal layer, has a common electrode 141 (not shown in FIG. 14) formed on a glass substrate 111. A liquid crystal capacitance Clc1 is formed between the pixel electrode 116 of the sub-pixel A and the common electrode 141, and a liquid crystal capacitance Clc2 is formed between the pixel electrode 117 of the sub-pixel B and the common electrode 141. Linear projections 142 which function as alignment restriction structures are formed on the common electrode 141 so as to extend parallel with the slit 144. The linear projections 142 are located approximately at the centers of the sub-pixels A and B so as to divide each of the sub-pixels A and B approximately equally into regions having different liquid crystal alignment directions. The control capacitance electrode 125 which connects the source electrode 122 to the storage capacitor electrode 119 overlaps with part of the linear projections 142 when viewed perpendicularly to the substrate surfaces. A light shield film (BM) 145 for shielding an end portion of the pixel region from light is formed in the counter substrate.

Now assume that the TFT 120 has been turned on, whereby a voltage is applied to the pixel electrode 116, that is, a voltage Vpx1 develops across the portion of the liquid crystal layer corresponding to the sub-pixel A. Since the voltage Vpx1 is divided according to the capacitance ratio of the liquid crystal capacitance Clc2 and the control capacitance Cc, a voltage that is applied to the pixel electrode 117 is different from the voltage applied to the pixel electrode 116. A voltage Vpx2 that develops across the portion of the liquid crystal layer corresponding to the sub-pixel B is given by $$Vpx2=\{Cc/(Clc2+Cc)\} \times Vpx1.$$

In this manner, in the liquid crystal display device having the pixel structure of FIG. 14, the voltages Vpx1 and Vpx2 developing across the portions of the liquid crystal layer corresponding to the sub-pixels A and B can be made different from each other in each pixel and hence the viewing angle characteristic is improved.

However, the liquid crystal display device shown in FIG. 14 has the following problems. When a voltage is applied, liquid crystal molecules in the sub-pixel A and those in the sub-pixel B are aligned in opposite directions that are perpendicular to the extension directions of the linear projections 142 with the linear projections 142 as boundaries. However, although liquid crystal molecules in the regions of the linear projections 142 are aligned parallel with the extension directions of the linear projections 142, it is indefinite which side in those directions they are directed to.

FIGS. 15A and 15B show structures of a portion, occupying a top portion of the pixel region, of the sub-pixel B and manners of alignment of liquid crystal molecules 108 in and close to the region of the associated linear projection 142. FIG. 16A is a sectional view of the liquid crystal display panel taken along line X-X in FIG. 15A, and FIG. 16B is a sectional view of the liquid crystal display panel taken along line Y-Y in FIG. 15B. FIGS. 15A and 16A show a state that white is displayed after display of halftone. FIGS. 15B and 16B show a state that white is displayed immediately after display of black (without in-between display of halftone). Whereas FIGS. 15A and 15B and FIGS. 16A and 16B show the manners of alignment of liquid crystal molecules 108 in and close to the region of the linear projection 142 that overlaps with the control capacitance electrode 125, the liquid crystal molecules 108 are aligned in similar manners even in the case where the linear projection 142 does not overlap with the control capacitance electrode 125.

As shown in FIGS. 15A and 16A, in the state that white is displayed after display of halftone, liquid crystal molecules 108 in the region of the linear projection 142 are inclined in one direction indicated by arrows in FIG. 15A, for example, because they are inclined gradually in such a direction as to be rendered stable in terms of energy. On the other hand, as shown in FIGS. 15B and 16B, in the state that white is displayed immediately after display of black, the liquid crystal molecules 108 in the region of the linear projection 142 are inclined toward a position close to the center of the linear projection 142 in its longitudinal direction when viewed from the counter substrate side. That is, there is a tendency that a singular point (s=+1) indicated by mark "•" in FIG. 15B is formed at the above position close to the center of the linear projection 142. As described above, the liquid crystal molecules 108 in and close to the region of the linear projection 142 are aligned in different manners in the state that white is displayed after display of halftone and in the state that white is displayed immediately after display of black. Therefore, in a case that, for example, white is displayed on the entire display screen after display of an image in which halftone and black exist in mixture, the balance of liquid crystal alignment directions of the pixels is lost and an afterimage may be seen depending on the viewing angle. This results in a problem that the display quality of the liquid crystal display device is much lowered.

Incidentally, prescribed capacitances are formed between the drain bus line 114 and the pixel electrodes 116 and 117. Particularly in the configuration in which no thick overcoat layer is formed between the drain bus line 114 and the pixel electrodes 116 and 117, the values of the capacitances formed tend to vary depending on the distances between the drain bus line 114 and the pixel electrodes 116 and 117 as measured parallel with the substrate surface. Therefore, if relative patterning deviations occur in the drain bus line 114 and the pixel electrodes 116 and 117 due to, for example, shot unevenness in divisional exposures, display unevenness that the display characteristics vary from one divisional exposure region to another will be found visually in a manufactured liquid crystal display device. It is therefore necessary to set the end portions of the pixel electrodes 116 and 117 as distant from the drain bus line 114 as possible so that differences in the display characteristics will be less likely found visually even if patterning deviations occur. However, if the end portions of the pixel electrodes 116 and 117 are set away from the drain bus line 114, the region where the pixel electrodes 116 and 117 are formed is made narrow, resulting in a problem that the pixel aperture ratio and the luminance decrease.

Further, a prescribed bonding registration error occurs when the TFT substrate and the counter substrate are bonded to each other. Therefore, it is necessary that the aperture of the BM 145 formed on the counter substrate side be set smaller than the region on the TFT substrate side where the pixel electrodes 116 and 117 are formed. This results in a problem that the pixel aperture ratio and the luminance decrease further.

SUMMARY OF THE INVENTION

An object of the present invention is therefore to provide a liquid crystal display device which is high in luminance and superior in display quality.

The above object is attained by a liquid crystal display device comprising a pair of substrates opposed to each other; a liquid crystal sealed between the pair of substrates; plural pixel regions each having a first pixel electrode formed on one of the pair of substrates and a second pixel electrode formed on the one substrate and separated from the first pixel electrode; a transistor disposed for each of the pixel regions and having a source electrode which is electrically connected to the first pixel electrode; a control capacitance portion which has a control capacitance electrode electrically connected to the source electrode and opposed to at least part of the second pixel electrode via an insulating film, and which thereby establishes capacitive coupling between the source electrode and the second pixel electrode; linear alignment restriction structures formed on the other substrate, for restricting alignment of the liquid crystal; and singular point control apertures formed in the first and/or second pixel electrode so as to occupy parts of overlap regions of the alignment restriction structures and the first and/or second pixel electrode as viewed perpendicularly to surfaces of the substrates, for controlling positions of singular points of alignment vectors of the liquid crystal.

The invention can realize a liquid crystal display device which is high in luminance and superior in display quality.

BRIEF DESCRIPTION OF THE DRAWINGS

FIGS. 15A and 15B show manners of alignment of liquid crystal molecules in the conventional liquid crystal display device; and FIGS. 16A and 16B are sectional views showing the manners of alignment of liquid crystal molecules in the conventional liquid crystal display device.

DESCRIPTION OF THE PREFERRED EMBODIMENTS

First Embodiment

A liquid crystal display device according to a first embodiment of the present invention will be described below with reference to FIGS. 1-6.

Figure 1:
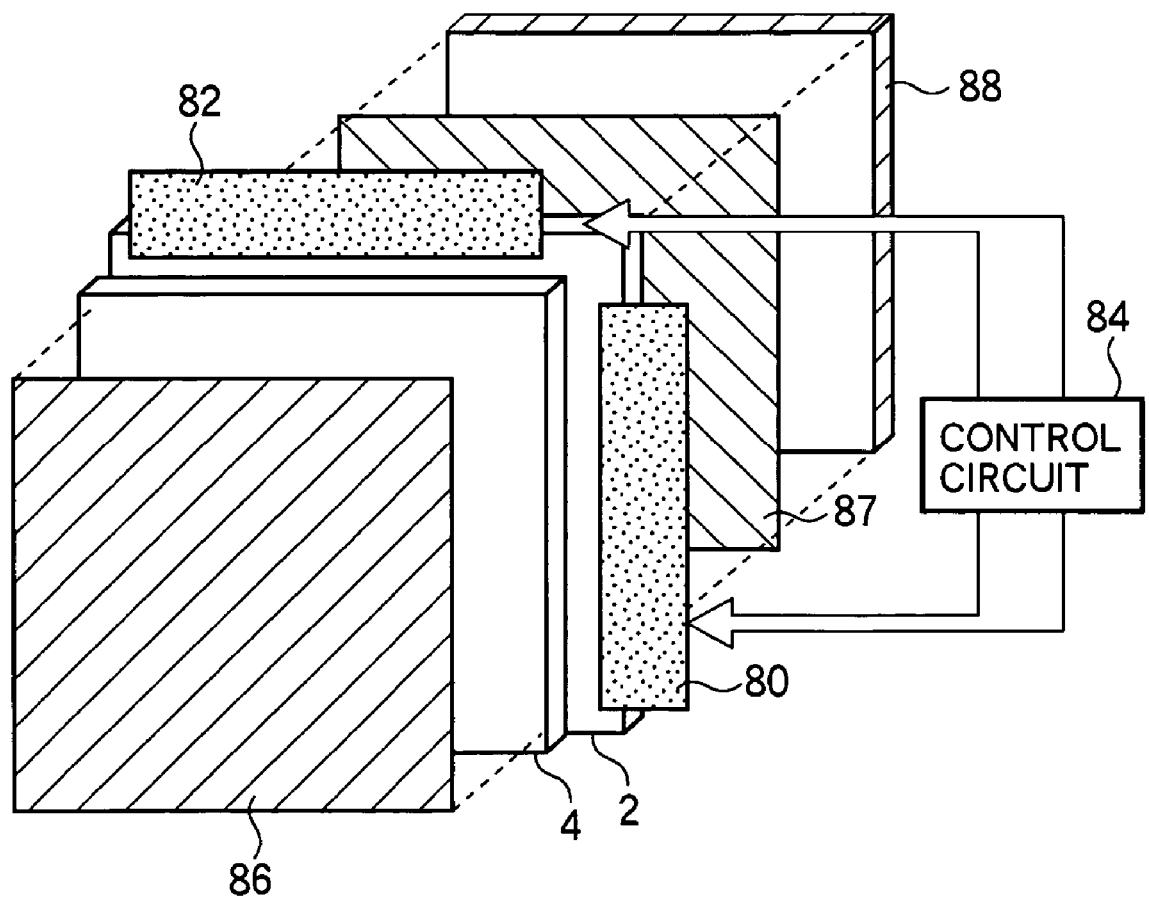
FIG. 1 schematically shows the configuration of liquid crystal display device according to a first embodiment of the present invention.

FIG. 1 schematically shows the configuration of the liquid crystal display device according to this embodiment. As shown in FIG. 1, the liquid crystal display device has a TFT substrate 2 which is provided with gate bus lines and drain bus lines that cross each other with an insulating film interposed in between, TFTs which are formed for the respective pixels, and pixel electrodes. The liquid crystal display device is also equipped with a counter substrate 4 opposed to the TFT substrate 2, in which color filters and a common electrode are formed and a liquid crystal 6 (not shown in FIG. 1) which is sealed between the substrates 2 and 4 and has negative dielectric anisotropy, for example. Vertical alignment films (not shown) for aligning the liquid crystal 6 vertically are formed at the boundary between the liquid crystal 6 and the TFT substrate 2 and the boundary between the liquid crystal 6 and the counter substrate 4.

A gate bus line driving circuit 80 incorporating a driver IC for driving the plural gate bus lines and a drain bus line driving circuit 82 incorporating a driver IC for driving the plural drain bus lines are connected to the TFT substrate 2. The driving circuits 80 and 82 output scanning signals and data signals to prescribed gate bus lines and drain bus lines on the basis of prescribed signals that are output from a control circuit 84. A polarizing plate 87 is disposed on that surface of the TFT substrate 2 which is opposite to its TFT elements formation surface and a polarizing plate 86 is disposed on that surface of the counter substrate 4 which is opposite to its common electrode formation surface, the polarizing plates 86 and 87 being in a crossed-Nicols arrangement. A backlight unit 88 is disposed on that surface of the polarizing plate 87 which is opposite to the TFT substrate 2.

Figure 2:
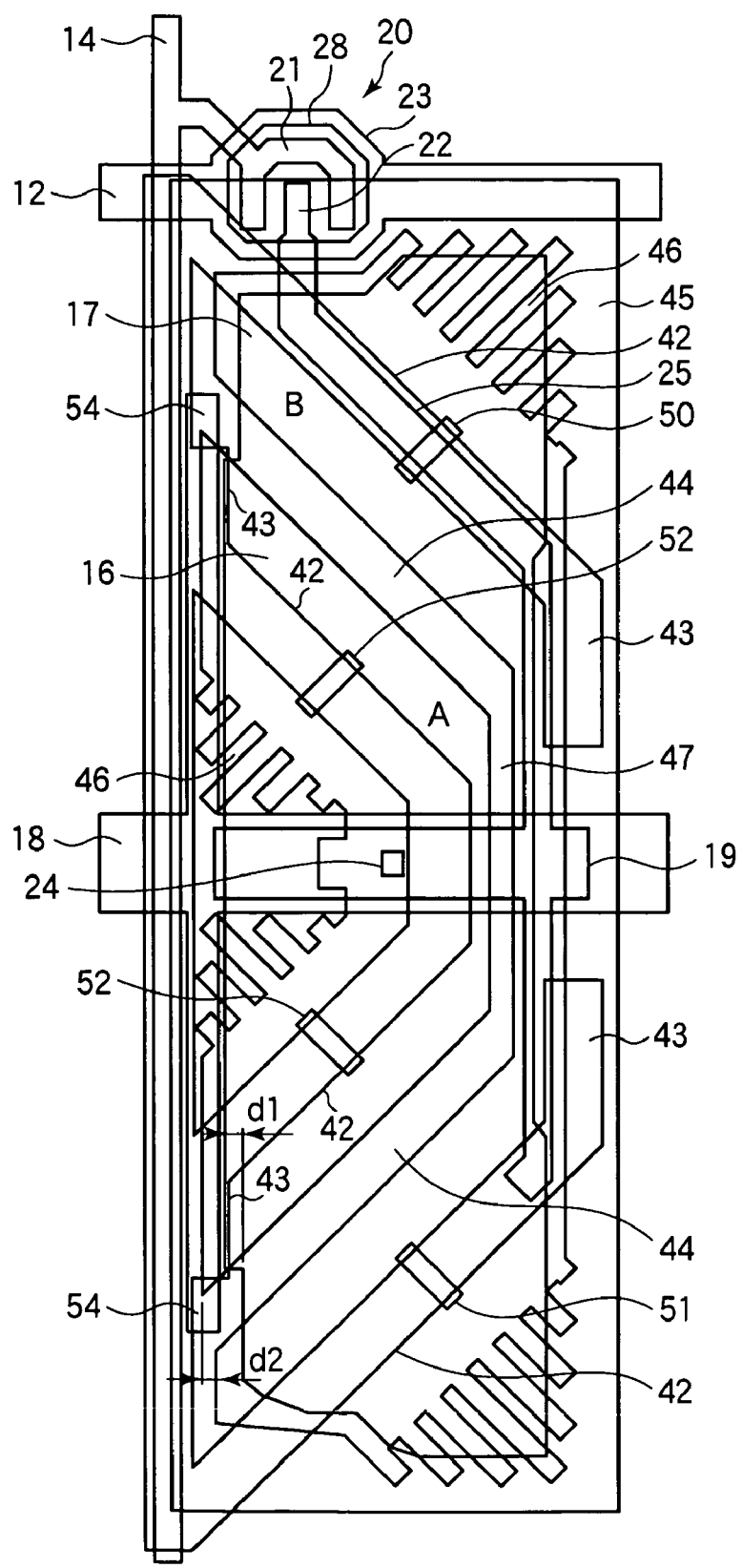
FIG. 2 shows a one-pixel configuration of the liquid crystal display device according to the first embodiment of the invention.
Figure 3:
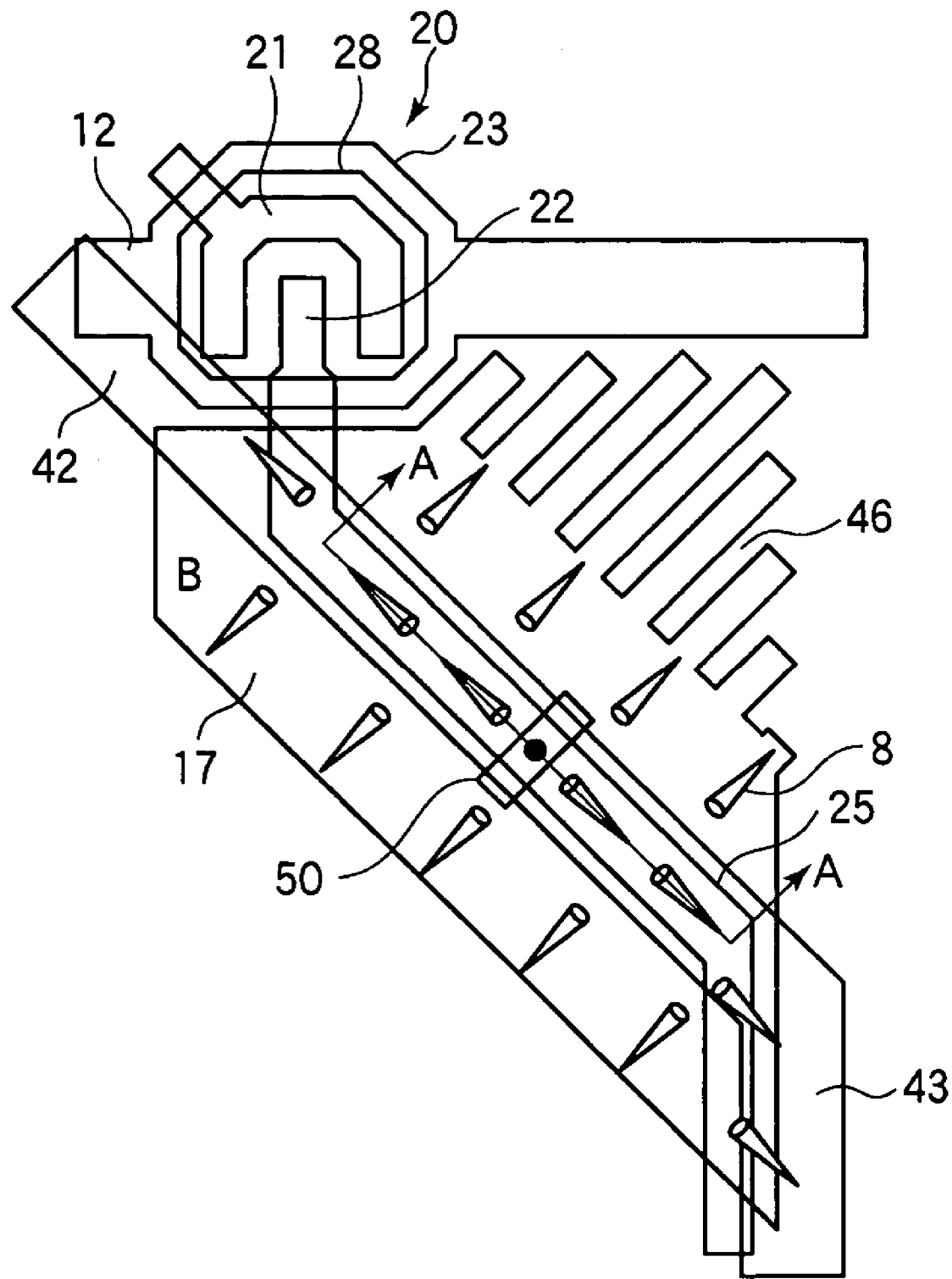
FIG. 3 shows the structure of part of one pixel of the liquid crystal display device according to the first embodiment of the invention and a manner of alignment of liquid crystal molecules.
Figure 4:
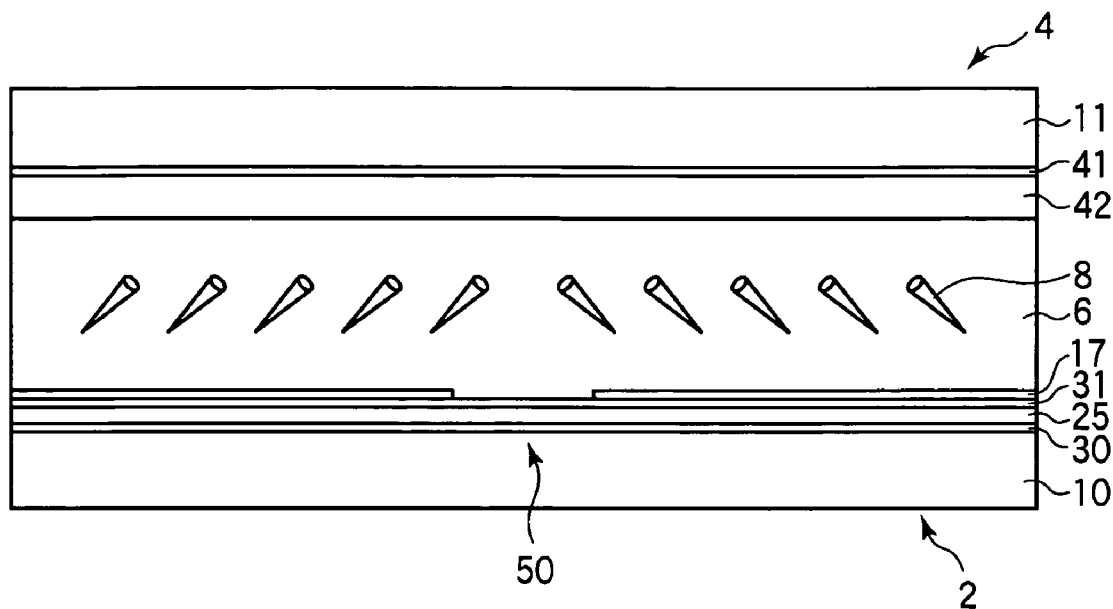
FIG. 4 is a sectional view showing the configuration of the liquid crystal display device according to the first embodiment of the invention and a manner of alignment of liquid crystal molecules.
Figure 5:
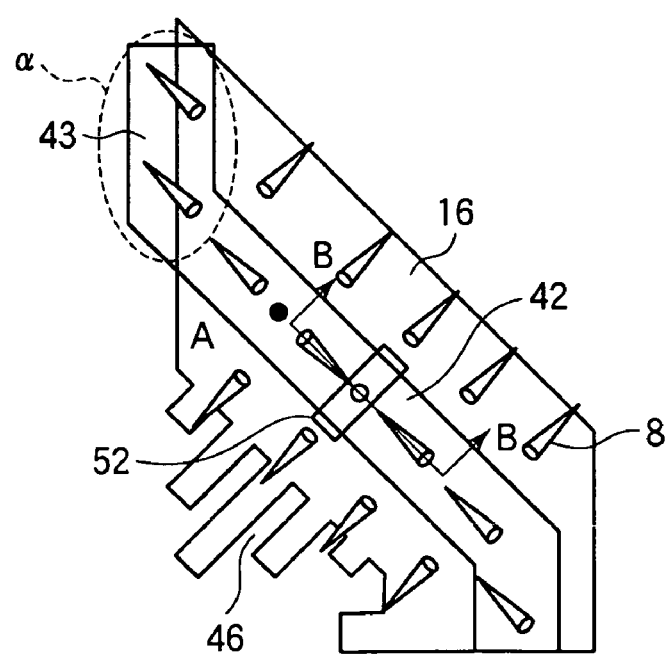
FIG. 5 shows the structure of another part of the one pixel of the liquid crystal display device according to the first embodiment of the invention and a manner of alignment of liquid crystal molecules.
Figure 6:
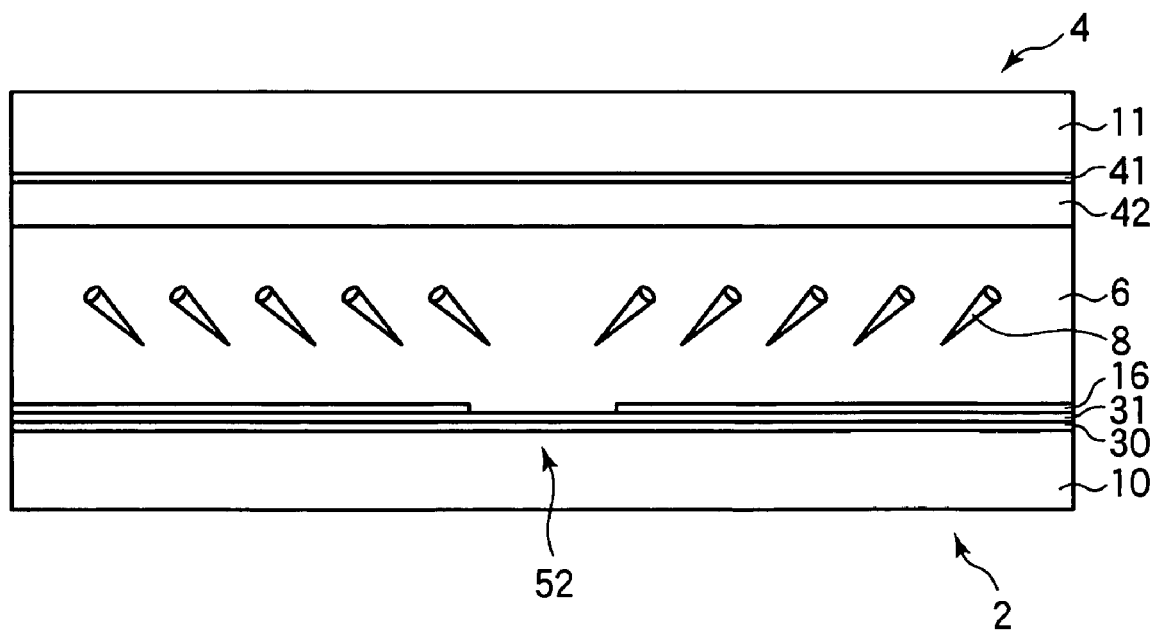
FIG. 6 is a sectional view showing the configuration of the liquid crystal display device according to the first embodiment of the invention and a manner of alignment of liquid crystal molecules.

FIG. 2 shows a one-pixel configuration of an MVA-type liquid crystal display device employing the capacitive coupling HT technique which is the liquid crystal display device according to this embodiment. FIG. 3 shows the structure of part of one pixel and a manner of alignment of liquid crystal molecules. FIG. 4 is a sectional view taken along line A-A in FIG. 3 showing the configuration of the liquid crystal display device and a manner of alignment of liquid crystal molecules. FIG. 5 shows the structure of another part of the one pixel and a manner of alignment of liquid crystal molecules. FIG. 6 is a sectional view taken along line B-B in FIG. 5 showing the configuration of the liquid crystal display device and a manner of alignment of liquid crystal molecules. As shown in FIGS. 2-6, the TFT substrate 2 of the liquid crystal display device has plural gate bus lines 12 which are formed on a glass substrate 10 and extend in the right-left direction in FIG. 2 and plural drain bus lines 14 which extend in the top-bottom direction in FIG. 2 and cross the gate bus lines 12 with an insulating film 30 interposed in between. Each of TFTs 20, which are formed as switching elements for the respective pixels, is disposed close to the crossing point of the associated set of a gate bus line 12 and a drain bus line 14. A gate electrode 23 of the TFT 20 is electrically connected to the associated gate bus line 12. An operation semiconductor layer (not shown) is formed on the gate electrode 23, and a channel protective film 28 is formed on the operation semiconductor layer. A bar-shaped source electrode 22 and a C-shaped drain electrode 21 which surrounds the source electrode 22 with a prescribed gap are formed on the channel protective film 28. The drain electrode 21 is electrically connected to the associated drain bus line 14. A protective film 31 is formed over the source electrode 22 and the drain electrode 21 (over the entire substrate surface).

A storage capacitor bus line 18 is formed so as to traverse a pixel region defined by the gate bus lines 12 and the drain bus lines 14 and to extend parallel with the gate bus lines 12. A storage capacitor electrode 19 is formed above the storage capacitor bus line 18 with the insulating film 30 interposed in between (the storage capacitor electrodes 19 are provided for the respective pixels). The storage capacitor electrode 19 is electrically connected to the source electrode 22 of the TFT 20 via a control capacitance electrode 25. A storage capacitor Cs is formed between the storage capacitor bus line 18 and the storage capacitor electrode 19.

The pixel region has sub-pixels A and B. The sub-pixel A has a trapezoidal shape, for example, and is disposed at the center (in the vertical direction) closer to the left sideline in the pixel region. The sub-pixel B is disposed so as to occupy portions of the pixel region excluding the sub-pixel A, that is, a top portion, a bottom portion, and a right-hand end portion that is located at the center (in the vertical direction). In the pixel, each of the sub-pixels A and B is approximately line-symmetrical with respect to the storage capacitor bus line 18. A pixel electrode 16 is formed in the sub-pixel A, and a pixel electrode 17 which is separated from the pixel electrode 16 is formed in the sub-pixel B. For example, both of the pixel electrodes 16 and 17 are transparent conductive films and are formed in the same layer. The pixel electrode 16 is electrically connected to the storage capacitor electrode 19 and the source electrode 22 of the TFT 20 via a contact hole 24 which is formed through the protective film 31 right above the storage capacitor electrode 19. On the other hand, the pixel electrode 17 is in an electrically floating state. The pixel electrode 17 has, in the top part of the pixel region (as viewed in FIG. 2), a region that is opposed to part of the control capacitance electrode 25 via the protective film 31. The pixel electrode 17 is connected indirectly to the source electrode 22 via a control capacitance Cc (control capacitance portion) formed in this region (capacitive coupling).

The pixel electrodes 16 and 17 are separated from each other by slits 44 and 47 which generally assume a ">" shape and surround the three sides of the trapezoidal pixel electrode 16. The slits 44 extend obliquely with respect to the end lines of the pixel region and the slit 47 extends parallel with the right-hand end line of the pixel region. The slits 44 also function as alignment restriction structures for restricting the alignment of a liquid crystal 6. The slits 44 and 47 should be thick enough to prevent short-circuiting of the pixel electrodes 16 and 17 (e.g., 10 µm or more).

The counter substrate 4, which is opposed to the TFT substrate 2 via the liquid crystal 6, has a common electrode (counter electrode) 41 formed on a glass substrate 11. A liquid crystal capacitance Clc1 is formed between the pixel electrode 16 of the sub-pixel A and the common electrode 41, and a liquid crystal capacitance Clc2 is formed between the pixel electrode 17 of the sub-pixel B and the common electrode 41. Bank-shaped linear projections (resin structures) 42 which function as alignment restriction structures are formed on the common electrode 41 so as to extend parallel with the slits 44 and obliquely with respect to the end lines of the pixel region. The slits 44 and the linear projections 42 extend in a direction that forms an angle of about 45° with the polarization axes of the polarizing plates 86 and 87 which are disposed outside and sandwich the TFT substrate 2 and the counter substrate 4. The linear projections 42 are made of a positive resist material such as a novolac resin. For example, the linear projections 42 are 1.0 µm in height and 10 µm in width. The linear projections 42 are located approximately at the centers of the sub-pixels A and B so as to divide each of the sub-pixels A and B approximately equally into regions in which the liquid crystal 6 have different alignment directions. In the pixel, the linear projections 42 are disposed so as to be approximately line-symmetrical with respect to the storage capacitor bus line 18, whereby in the pixel (more specifically, in the sub-pixels A and B) the liquid crystal 6 are aligned uniformly in four orthogonal directions. The control capacitance electrode 25 which connects the source electrode 22 to the storage capacitor electrode 19 overlaps with part of the linear projections 42 when viewed perpendicularly to the substrate surfaces. The liquid crystal 6 tends to suffer alignment failures in those regions of the pixel electrodes 16 and 17 which are relatively distant from the linear projections 42. To solve this problem, the pixel electrodes 16 and 17 are formed with, in those regions, minute slits 46 which extend approximately perpendicularly to the linear projections 42. Liquid crystal molecules 8 are aligned parallel with the extension directions of the minute slits 46, whereby the liquid crystal 6 is prevented from suffering alignment failures.

Auxiliary projections 43 are formed in regions that are close to the crossing positions of the linear projections 42 and the end lines of the pixel electrodes 16 and 17 and that form obtuse angles with the extension directions of the linear projections 42 when viewed perpendicularly to the substrate surfaces. The auxiliary projections 43 are formed, for example, in the same layer as the linear projections 42 and extend approximately parallel with the drain bus line 14. The auxiliary projections 43 are provided to cancel out influences of electric fields developing near the end lines of the pixel electrodes 16 and 17, and are disposed so as to overlap with the end portions of the pixel electrodes 16 and 17 when viewed perpendicularly to the substrate surfaces. A light shield film (BM) 45 for shielding an end portion of the pixel region from light is formed in the counter substrate 4.

Now assume that the TFT 20 has been turned on, whereby a voltage is applied to the pixel electrode 16, that is, a voltage Vpx1 develops across the portion of the liquid crystal layer corresponding to the sub-pixel A. Since the voltage Vpx1 is divided according to the capacitance ratio of the liquid crystal capacitance Clc2 and the control capacitance Cc, a voltage that is applied to the pixel electrode 17 is different from the voltage applied to the pixel electrode 16. A voltage Vpx2 that develops across the portion of the liquid crystal layer corresponding to the sub-pixel B is given by $$Vpx2=\{Cc/(Clc2+Cc)\} \times Vpx1.$$

Since $0<Cc/(Clc2+Cc)<1$, a relationship $|Vpx1|>|Vpx2|$ holds except in a case of Vpx1=Vpx2=0. In this manner, in the liquid crystal display device according to this embodiment, the voltages Vpx1 and Vpx2 developing across the portions of the liquid crystal layer corresponding to the sub-pixels A and B can be made different from each other in each pixel. As a result, distortion in the T-V characteristic is distributed in each pixel and the phenomenon that an image looks whitish when viewed from a oblique direction is suppressed. The viewing angle characteristic is thus improved.

In this embodiment, singular point control apertures 50, 51, and 52 for controlling the positions of singular points of alignment vectors of the liquid crystal 6 are formed at portions of the overlap regions of the linear projections 42 and the pixel electrodes 16 and 17 as viewed perpendicularly to the substrate surfaces. The apertures 50 and 51 are formed by removing the pixel electrode 17 partially, and the apertures 52 are formed by removing the pixel electrode 16 partially. For example, the apertures 50, 51, and 52 are about 5 µm in width and about 15 µm in length. For example, the longitudinal directions of the apertures 50, 51, and 52 are approximately perpendicular to the extension directions of the linear projections 42. At least one aperture 50 or 51 is formed in the sub-pixel B and at least one aperture 52 is formed in the sub-pixel A.

The aperture 50 in the top portion of the sub-pixel B is disposed approximately at the center of the overlap region of the associated linear projection 42 and the pixel electrode 17 as viewed perpendicularly to the substrate surfaces (see FIGS. 3 and 4). In the region where the aperture 50 is formed by removing the pixel electrode 17 partially, the control capacitance electrode 25 is exposed as an electrode via the protective film 31. The potential difference between the common electrode 41 and the pixel electrode 17 which is connected to the source electrode 22 via the control capacitance Cc is smaller than that between the common electrode 41 and the pixel electrode 16 which is connected to the source electrode 22 directly. Since the control capacitance electrode 25 has the same potential as the source electrode 22 and the pixel electrode 16, the potential difference between the common electrode 41 and the control capacitance electrode 25 which is exposed in the region of formation of the aperture 50 is larger than that between the common electrode 41 and the pixel electrode 17. In this case, as shown in FIGS. 3 and 4, when a voltage is applied, because of distortion of the electric field, liquid crystal molecules 8 are inclined toward the portion having the large potential difference, that is, toward the aperture 50 where the control capacitance electrode 25 is exposed. As a result, all the liquid crystal molecules 8 around the aperture 50 are inclined toward the aperture 50; a singular point ($s=+1$; indicated by mark "•" in FIG. 3) is formed firmly in the region of formation of the aperture 50. The position of this singular point does not vary between, for example, a case that white is display after display of halftone and a case that white is displayed after display of black. Where as in this embodiment the aperture 50 is disposed approximately at the center of the overlap region of the linear projection 42 and the pixel electrode 17, liquid crystal molecules 8 in the region where the linear projection 42 is formed are aligned in the directions from both ends of the linear projection 42 to its center.

Each aperture 52 in the sub-pixel A is disposed approximately at the center of the overlap region, as viewed perpendicularly to the substrate surfaces, of the pixel electrode 16 and the associated linear projection 42 extending obliquely with respect to the end lines of the pixel region (see FIGS. 5 and 6). The two apertures 52 are disposed in the top portion and the bottom portion of the pixel region, respectively, so as to be approximately line-symmetrical with respect to the storage capacitor bus line 18. Since no part of the control capacitance electrode 25 is formed in the sub-pixel A, the apertures 52 do not overlap with the control capacitance electrode 25. That is, no electrode exists on the TFT substrate 2 side in the regions where the apertures 52 are formed by removing the pixel electrode 16 partially. Therefore, the potential difference between the common electrode 41 and the TFT substrate 2 in the regions of formation of the apertures 52 is smaller than that between the common electrode 41 and the pixel electrode 16. In this case, as shown in FIGS. 5 and 6, when a voltage is applied, liquid crystal molecules 8 are inclined toward the portions having the large potential difference, that is, in the directions going away from each aperture 52, which are opposite to the directions in the above-described case of the aperture 50. On the other hand, the linear projections 42 which overlap with the apertures 52 restrict the alignment of liquid crystal molecules 8 in the regions other than the regions where the linear projections 42 are formed so that the liquid crystal molecules 8 are inclined toward the linear projections 42 in the directions perpendicular to the extension directions of the linear projections 42. The alignment restriction force of the linear projections 42 is stronger than that of the apertures 52, as a result of which the liquid crystal molecules 8 in the regions where the linear projections 42 are formed are inclined away from the apertures 52 and the liquid crystal molecules 8 in the regions other than the regions where the linear projections 42 are formed are inclined toward the linear projections 42 including the regions of the apertures 52. As a result, singular points ($s=-1$; indicated by mark "?" in FIG. 5) are formed firmly in the regions of formation of the apertures 52. The positions of these singular points do not vary between, for example, a case that white is display after display of halftone and a case that white is displayed after display of black.

Liquid crystal molecules 8 in a region α where each auxiliary projection 43 is formed are inclined toward the inside of the pixel electrode 16 due to influences of the auxiliary projection 43 and the edge of the pixel electrode 16. Therefore, a singular point ($s=+1$; indicated by mark "•") is formed between the top-left end (in FIG. 5) of the linear projection 42 and the associated aperture 52. The position of this singular point may vary between a case that white is displayed after display of halftone and a case that a white is displayed after display of black. However, this does not lower the display quality to a large extent because the position varies only in the range between the top-left end (in FIG. 5) and the associated aperture 52.

Like the aperture 50, the aperture 51 in the bottom portion of the sub-pixel B is disposed approximately at the center in the overlap region of the associated linear projection 42 and the pixel electrode 17 as viewed perpendicularly to the substrate surfaces. Since no part of the control capacitance electrode 25 is formed in this region, a singular point ($s=-1$) is formed firmly in the region of formation of the aperture 51 like the singular point formed in the region of formation of the aperture 52 (see FIGS. 5 and 6).

The singular points in the regions of formation of the apertures 51, 52, and 53 do not move, that is, they are formed at the same positions stably. Therefore, no afterimage is found visually and the display quality of the liquid crystal display device is increased accordingly.

In this embodiment, light shield plates 54 of 4 μm in width, for example, are formed close to the ends (left-hand ends in FIG. 2), opposed to the drain bus line 14, of the pixel electrode 16 are formed so as to extend parallel with the ends. The light shield plates 54 have a function of shielding the end portions of the pixel region from light. The light shield plates 54 are formed in the same layer as and electrically connected to the storage capacitor bus line 18. Therefore, the light shield plates 54 are kept at the same potential (common potential) as the storage capacitor bus line 18 and the common electrode 41. Therefore, no voltage is applied to portions of the liquid crystal layer in and close to the regions where the light shield plates 54 are formed, whereby light leakage etc. are suppressed more in a normally-black-mode liquid crystal display device.

Since the light shield plates 54 are formed on the TFT substrate 2 side, no consideration need to be given to bonding misregistration etc. in this connection. Therefore, the light shield plates 54 can be disposed outside of the BM 45 when viewed perpendicularly to the substrate surfaces and the end line of the BM 45 can be shifted outward by a width d1 in a region corresponding to the light shield plates 54. When viewed perpendicularly to the substrate surfaces, in the regions corresponding to the light shield plates 54, the interval between the end line of the BM 45 and the drain bus line 14 is shorter than in the other regions.

The light shield plates 54 may overlap with the pixel electrode 16. Further, the light shield plates 54 reduce influences of the capacitance between the drain bus line 14 and the pixel electrode 16; a display failure due to crosstalk does not occur even if the pixel electrode 16 is disposed close to the drain bus line 14. In this embodiment, the width of the overlaps between the light shield plates 54 and the pixel electrode 16 is about 2 μm. If the light shield plates 54 overlapped with the pixel electrode 17 which is connected to the source electrode 22 by capacitive coupling, a new capacitance would occur between the light shield plates 54 and the pixel electrode 17. Therefore, the light shield plates 54 do not extend to come close to the ends, opposed to the drain bus line 14, of the pixel electrode 17. As a result of the above designs, the ends, opposed to the drain bus line 14, of the pixel electrode 16 are closer to the drain bus line 14 by a length d2 than the ends, opposed to the drain bus line 14, of the pixel electrode 17 are. In this manner, in this embodiment, the light shield plates 54 increases the aperture ratio of each pixel and hence the luminance of the liquid crystal display device.

As described above, according to this embodiment, not only can singular points be formed reliably in the regions where the linear projections 42 are formed but also their positions can be fixed substantially. Since the positions of the singular points do not vary due to, for example, a difference in the manner of a transition between gradation levels, no afterimage is found visually. Even when a local pressure is applied externally to the substrate surface by a finger push, for example, the singular points do not move and hence the degree of resulting display unevenness is suppressed. As such, this embodiment can increase the display quality of the liquid crystal display device.

Further, in this embodiment, the light shield plates 54 which are kept at the same potential as the common electrode 41 are disposed close to the ends, opposed to the drain bus line 14, of the pixel electrode 16 which is electrically connected to the source electrode 22. This prevents light leakage near the ends of the pixel electrode 16 as well as a display failure due to crosstalk. In addition, the light shield plates 54 increase the aperture ratio of each pixel and hence the luminance of the liquid crystal display device.

Second Embodiment

Figure 7:
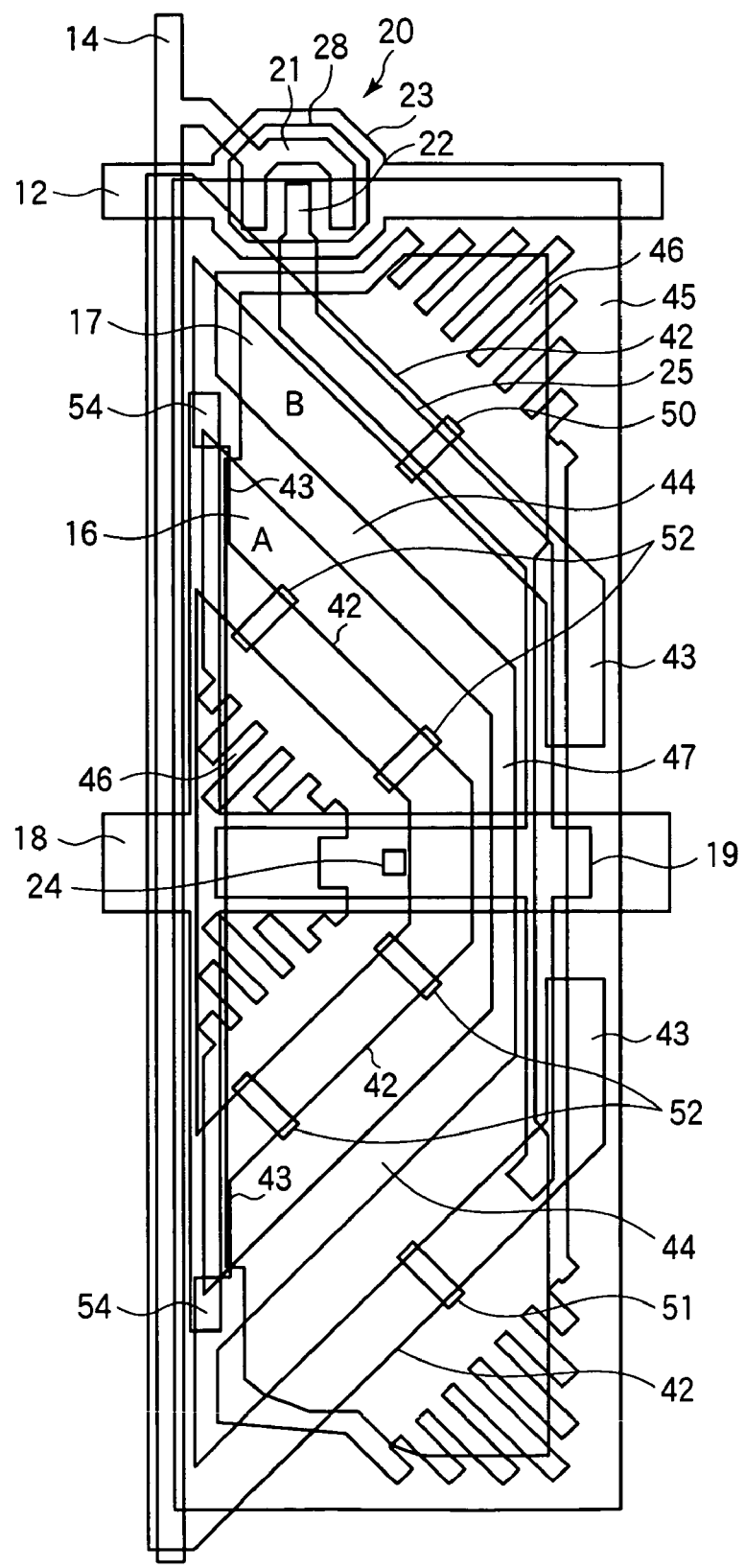
FIG. 7 shows a one-pixel configuration of a liquid crystal display device according to a second embodiment of the invention.

Next, a liquid crystal display device according to a second embodiment of the invention will be described with reference to FIG. 7. FIG. 7 shows a one-pixel configuration of the liquid crystal display device according to this embodiment. As shown in FIG. 7, this embodiment is different from the first embodiment in that four apertures 52 are disposed in the top portion and the bottom portion of the pixel region (two apertures 52 in each portion) so as to be approximately line-symmetrical with respect to the storage capacitor bus line 18. Two apertures 52 are disposed close to both ends, in the longitudinal direction, of the overlap region, as viewed perpendicularly to the substrate surfaces, of the associated linear projection 42 and the pixel electrode 16. As a result, in the sub-pixel A, singular points (s=−1) are formed in the regions of formation of the two apertures 52 that are close to both ends of the overlap region of the associated linear projection 42 and the pixel electrode 16. And a singular point (s=+1) is formed between these two singular points. For example, in a liquid crystal display device having a large pixel size, the interval between the two apertures 52 is wide. In this case, one new aperture 52 may be provided approximately at the middle position between the two apertures 52. Alternatively, plural new apertures 52 may be provided between the two apertures 52 so as to be arranged, for example, approximately at regular intervals in the extension direction of each linear projection 42.

According to this embodiment, singular points can be formed reliably and their positions can almost be fixed, whereby the display quality of the liquid crystal display device is increased as in the case of the first embodiment. Further, this embodiment is the same as the first embodiment in that the light shield plates 54 prevent light leakage and a display failure due to crosstalk and increase the aperture ratio of each pixel and hence the luminance of the liquid crystal display device.

Third Embodiment

Figure 8:
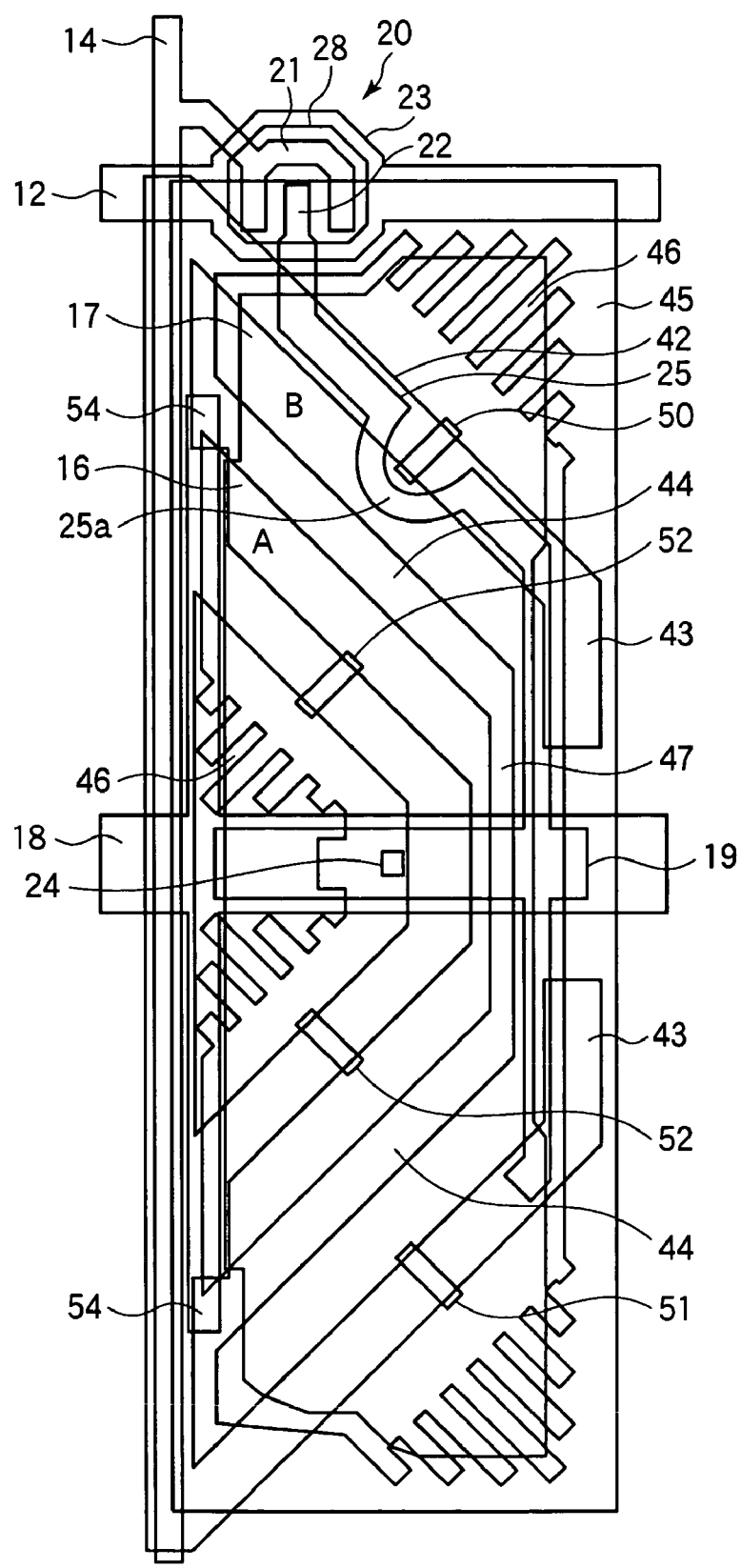
FIG. 8 shows a one-pixel configuration of a liquid crystal display device according to a third embodiment of the invention.

Next, a liquid crystal display device according to a third embodiment of the invention will be described with reference to FIG. 8. FIG. 8 shows a one-pixel configuration of the liquid crystal display device according to this embodiment. As shown in FIG. 8, the apertures 50, 51, and 52 are disposed in the same manner as in the first embodiment. This embodiment is different from the first embodiment in that that portion of the control capacitance electrode 25 which is located in the top portion of the sub-pixel B has a bypass portion 25a which bypasses the region of formation of the aperture 50 in the plane parallel with the substrate surfaces. With this measure, the aperture 50 does not overlap with the control capacitance electrode 25 and hence no electrode exists on the TFT substrate 2 side in the region of formation of the aperture 50. Therefore, a singular point (s=−1) is formed in the region of formation of the aperture 50 as in the regions of formation of the other apertures 51 and 52. In this embodiment, in each pixel, singular points are formed so as to be approximately symmetrical with respect to the storage capacitor bus line 18.

According to this embodiment, singular points can be formed reliably and their positions can almost be fixed, whereby the display quality of the liquid crystal display device is increased as in the case of the first embodiment. Further, this embodiment is the same as the first embodiment in that the light shield plates 54 prevent light leakage and a display failure due to crosstalk and increase the aperture ratio of each pixel and hence the luminance of the liquid crystal display device.

Fourth Embodiment

Figure 9:
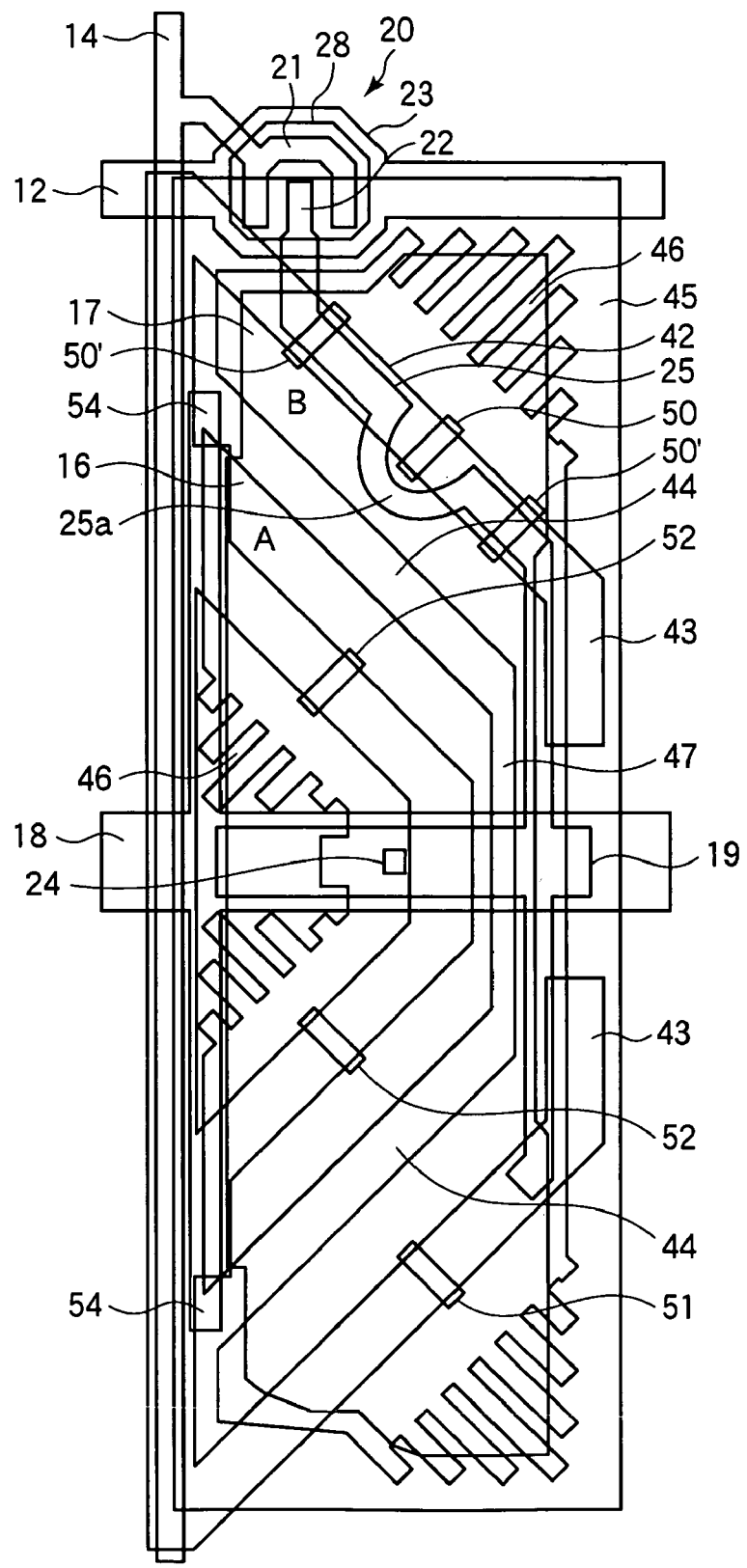
FIG. 9 shows a one-pixel configuration of a liquid crystal display device according to a fourth embodiment of the invention.

Next, a liquid crystal display device according to a fourth embodiment of the invention will be described with reference to FIG. 9. FIG. 9 shows a one-pixel configuration of the liquid crystal display device according to this embodiment. As shown in FIG. 9, this embodiment is different from the third embodiment in that two additional apertures 50' which overlap with the control capacitance electrode 25 are formed on both sides of the aperture 50 which is bypassed by the control capacitance electrode 25. With this measure, not only is a singular point (s=−1) formed in the region of formation of the aperture 50 but also singular points (s=+1) are formed fixedly in the regions of formation of the two apertures 50' which are located on both sides of the former singular point (s=−1).

According to this embodiment, singular points can be formed reliably and their positions can almost be fixed, whereby the display quality of the liquid crystal display device is increased as in the case of the first embodiment. Further, this embodiment is the same as the first embodiment in that the light shield plates 54 prevent light leakage and a display failure due to crosstalk and increase the aperture ratio of each pixel and hence the luminance of the liquid crystal display device.

Fifth Embodiment

Figure 10:
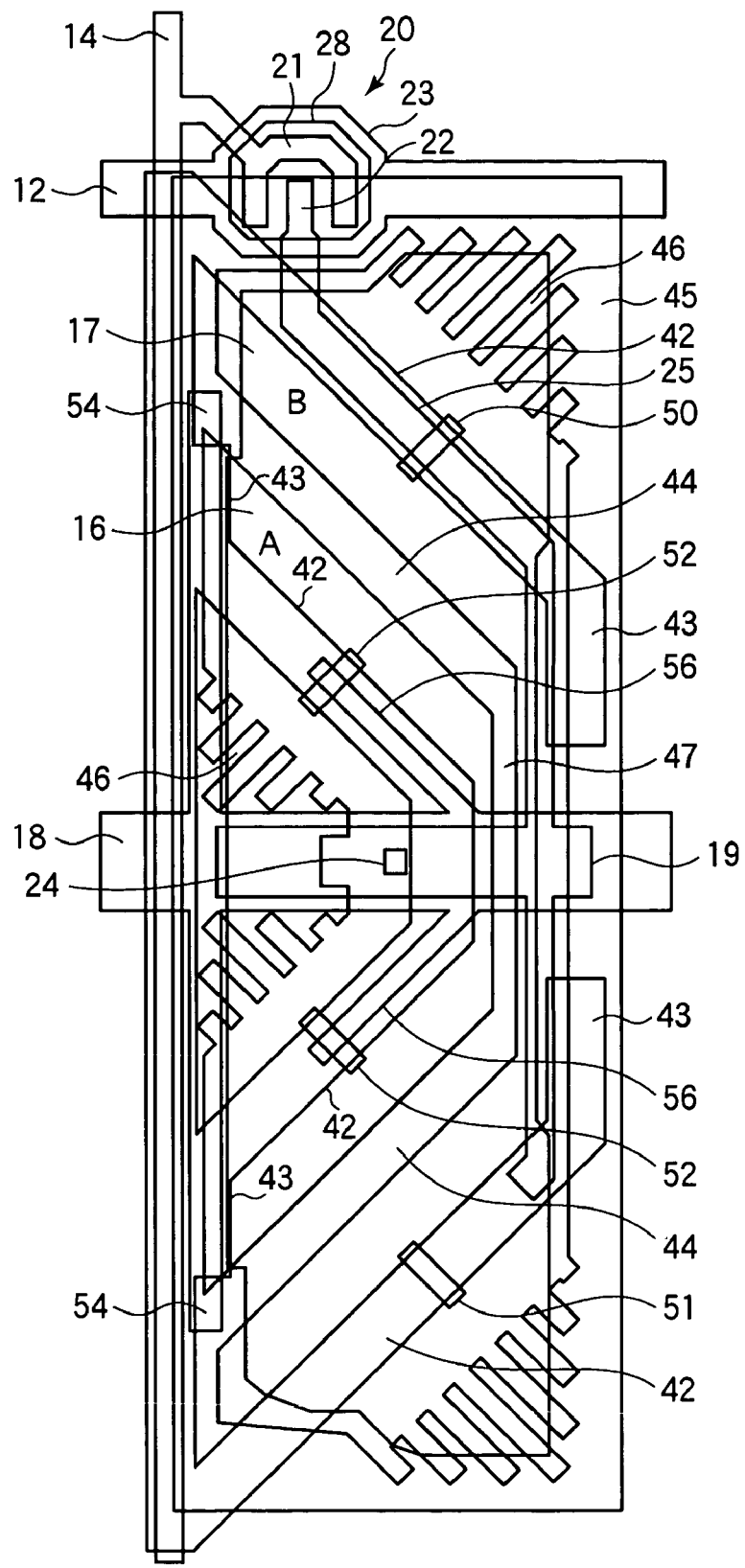
FIG. 10 shows a one-pixel configuration of a liquid crystal display device according to a fifth embodiment of the invention.

Next, a liquid crystal display device according to a fifth embodiment of the invention will be described with reference to FIGS. 10-12. FIG. 10 shows a one-pixel configuration of the liquid crystal display device according to this embodiment. As shown in FIG. 10, this embodiment is different from the first embodiment in that auxiliary electrodes 56 are formed additionally. The auxiliary electrodes 56 are disposed so as to overlap with the overlap regions of the pixel electrode 16 of the sub-pixel A and the associated linear projections 42 and to extend along the overlap regions in their longitudinal directions, respectively. The auxiliary electrodes 56 are formed in the same layer as and electrically connected to the storage capacitor bus line 18. That is, the auxiliary electrodes 56 are kept at the same potential (common potential) as the storage capacitor bus line 18 and the common electrode 41. The auxiliary electrodes 56 branch off the storage capacitor bus line 18 and extend to the regions of formation of the apertures 52, and an end portion of each auxiliary electrode 56 overlaps with the associated aperture 52. Each auxiliary electrode 56 is exposed as an electrode via the protective film 31 and the insulating film 30 in part (or all) of the region of formation of the associated aperture 52.

Figure 11:
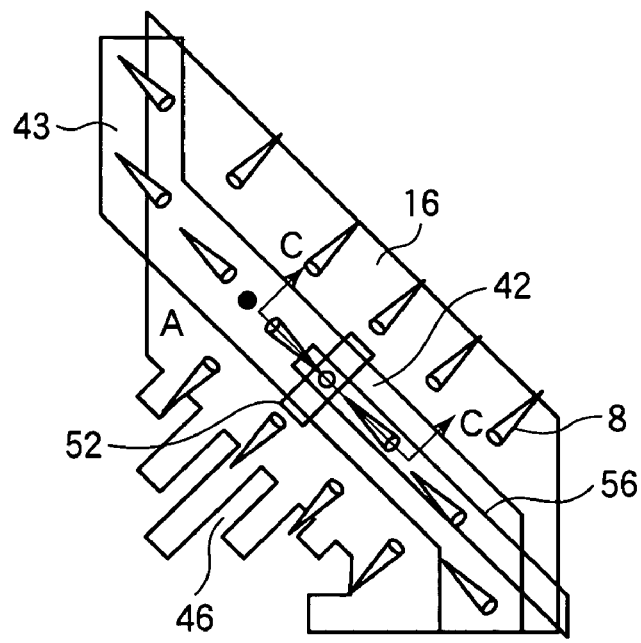
FIG. 11 shows the structure of part of one pixel of the liquid crystal display device according to the fifth embodiment and a manner of alignment of liquid crystal molecules.
Figure 12:
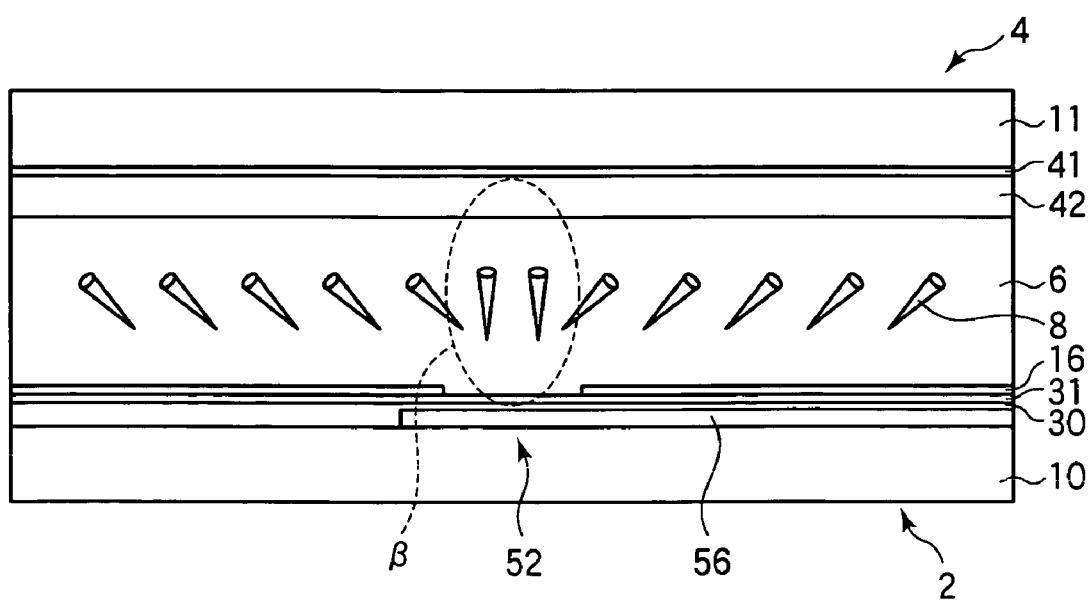
FIG. 12 is a sectional view showing the configuration of the liquid crystal display device according to the fifth embodiment of the invention and a manner of alignment of liquid crystal molecules.

FIG. 11 shows the structure of the top half of the sub-pixel A and a manner of alignment of liquid crystal molecules. FIG. 12 is a sectional view taken along line C-C in FIG. 11 showing the configuration of the liquid crystal display device. As shown in FIGS. 11 and 12, a singular point (s=−1) is formed in a region β of formation of the aperture 52 in the same manner as in the first embodiment. In the region β, no voltage is applied to the liquid crystal 6 because the auxiliary electrode 56 having the same potential as the common electrode 41 is exposed there. Therefore, at least part of the liquid crystal molecules 8 in the region β are oriented perpendicularly to the substrate surfaces. As a result, a singular point (s=−1) is formed more firmly in the region β of formation of the aperture 52 than in the first embodiment.

According to this embodiment, singular points can be formed more reliably and their positions can almost be fixed, whereby the display quality of the liquid crystal display device is increased more than in the first embodiment. Further, this embodiment is the same as the first embodiment in that the light shield plates 54 prevent light leakage and a display failure due to crosstalk and increase the aperture ratio of each pixel and hence the luminance of the liquid crystal display device.

Sixth Embodiment

Figure 13:
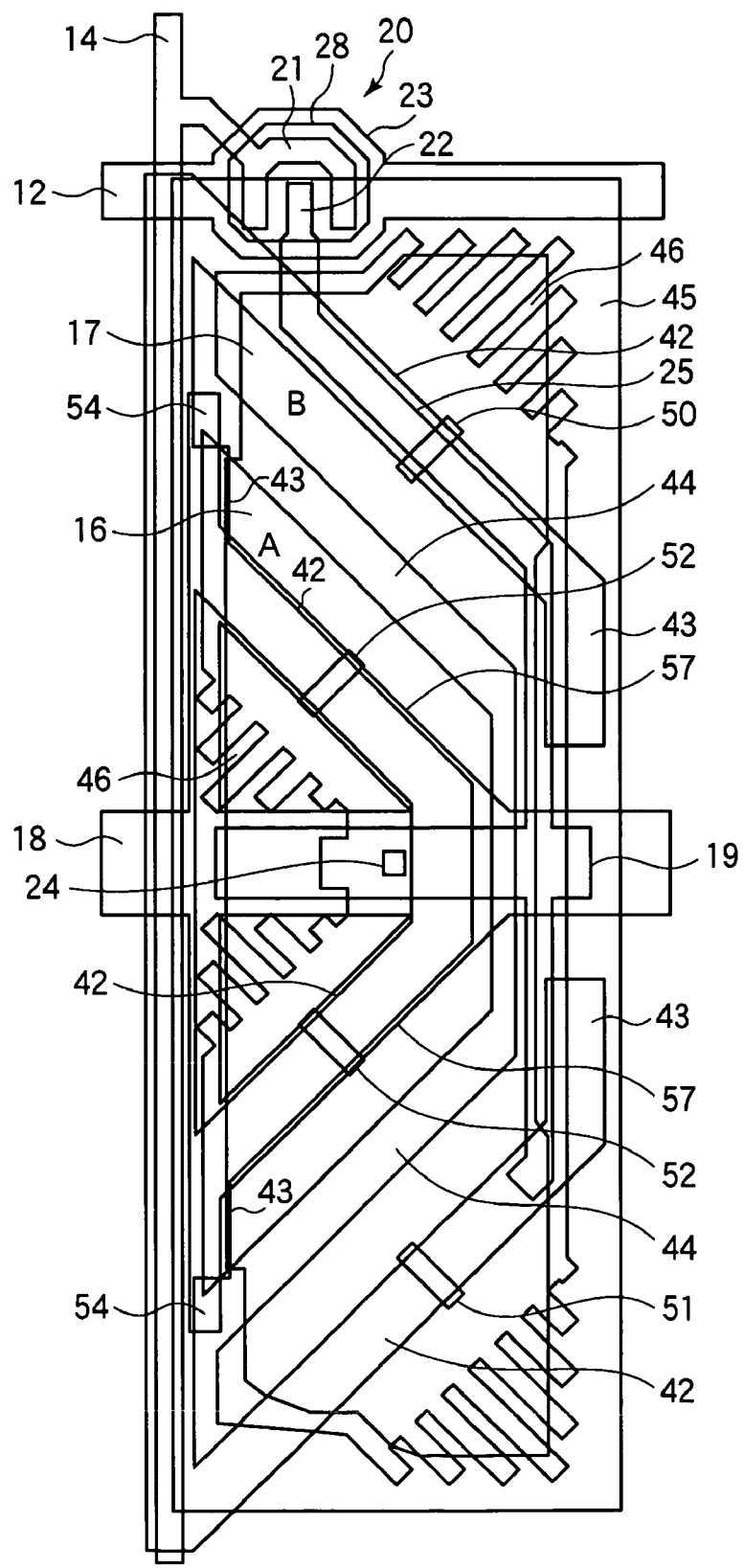
FIG. 13 shows a one-pixel configuration of a liquid crystal display device according to a sixth embodiment of the invention.
Figure 14:
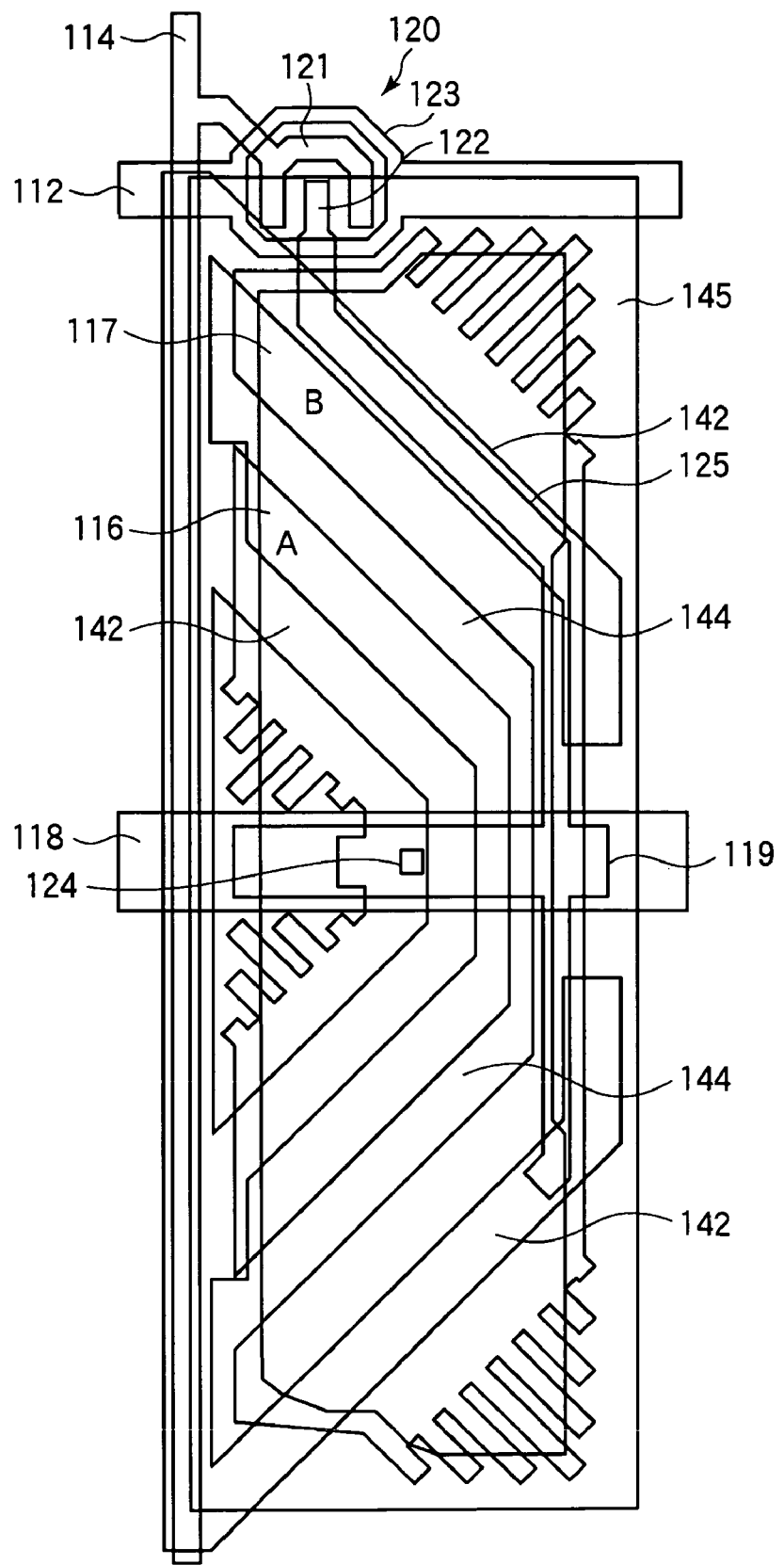
FIG. 14 shows a one-pixel configuration of a conventional liquid crystal display device.

Next, a liquid crystal display device according to a sixth embodiment of the invention will be described with reference to FIG. 13. FIG. 13 shows a one-pixel configuration of the liquid crystal display device according to this embodiment. As shown in FIG. 13, this embodiment is different from the fifth embodiment in that each of auxiliary electrodes 57 is formed so as to cover almost all of the associated one of the overlap regions of the pixel electrode 16 of the sub-pixel A and the linear projections 42. The regions of formation of the auxiliary electrodes 57 are approximately the same as those of the linear projections 42 in the sub-pixel A. One end of each auxiliary electrode 57 is connected to the storage capacitor bus line 18 and the other end is connected to the associated light shield plate 54. Since the auxiliary electrodes 57 have a light shield function, the degree of transmission of light in the regions of formation of the linear projections 42 lowers and hence the luminance of the liquid crystal display device may somewhat decrease. However, the auxiliary electrodes 57 interrupt leakage light occurring due to the presence of the linear projections 42, whereby the contrast of the liquid crystal display device can be increased.

The invention is not limited to the above embodiments and various modifications are possible.

For example, although the above embodiments are directed to the transmission-type liquid crystal display device, the application field of the invention is not limited to it and includes liquid crystal display devices of other kinds such as the reflection type and the semi-transmission type.

Further, although in the above embodiments employ the linear projections 42 as the counter-substrate-4-side alignment restriction structures, the invention is not limited to such a case. Slits (common-electrode-omitted portions) formed by removing linear portions of the common electrode 41 may be used as alignment restriction structures.

What is claimed is:

1. A liquid crystal display device comprising:
a pair of substrates opposed to each other;
a liquid crystal sealed between the pair of substrates;
plural gate bus lines formed on one of the pair of substrates;
plural drain bus lines formed so as to cross the gate bus lines with an insulating film interposed in between;
plural pixel regions each having a first pixel electrode formed on the one substrate and a second pixel electrode formed on the one substrate and separated from the first pixel electrode;
a transistor disposed for each of the pixel regions and having a source electrode which is electrically connected to the first pixel electrode;
a control capacitance portion which has a control capacitance electrode electrically connected to the source electrode and opposed to at least part of the second pixel electrode via an insulating film, and which thereby establishes capacitive coupling between the source electrode and the second pixel electrode;
linear alignment restriction structures formed on the other substrate, for restricting alignment of the liquid crystal; and
singular point control apertures formed in the first and/or second pixel electrode so as to occupy parts of overlap regions of the alignment restriction structures and the first and/or second pixel electrode as viewed perpendicularly to surfaces of the substrates, for controlling positions of singular points of alignment vectors of the liquid crystal.

2. The liquid crystal display device according to claim 1, wherein the control capacitance electrode almost coextends with one of the alignment restriction structures when viewed perpendicularly to the surfaces of the substrates.

3. The liquid crystal display device according to claim 2, wherein the control capacitance electrode is formed in a layer that is lower than a layer of the second pixel electrode and part of the singular point control apertures are disposed so as to overlap with the control capacitance electrode.

4. The liquid crystal display device according to claim 2, wherein at least part of the singular point control apertures are disposed so as not to overlap with the control capacitance electrode.

5. The liquid crystal display device according to claim 4, wherein the control capacitance electrode are formed so as to bypass at least part of the singular point control apertures in a plane parallel with the surfaces of the substrates.

6. The liquid crystal display device according to claim 1, further comprising a slit which separates the first and second pixel electrodes from each other, wherein the slit is disposed so as to extend parallel with the alignment restriction structures.

7. The liquid crystal display device according to claim 1, wherein each of at least part of the singular point control apertures is disposed approximately at the center of an associated one of the overlap regions of the alignment restriction structures and the first and/or second pixel electrode as viewed perpendicularly to the surfaces of the substrates.

8. The liquid crystal display device according to claim 1, wherein at least part of the singular point control apertures are disposed close to both ends, in its longitudinal direction, of an associated one of the overlap regions of the alignment restriction structures and the first and/or second pixel electrode as viewed perpendicularly to the surfaces of the substrates.

9. The liquid crystal display device according to claim 1, wherein at least part of the singular point control apertures are arranged approximately at regular intervals in an extension direction of an associated one of the alignment restriction structures.

10. The liquid crystal display device according to claim 1, further comprising:
a common electrode formed on the other substrate; and
auxiliary electrodes which are disposed so as to overlap with the singular point control apertures formed in the first pixel electrodes and are kept at approximately the same potential as the common electrode.

11. The liquid crystal display device according to claim 10, wherein the auxiliary electrodes extend, in their longitudinal directions, along the overlap regions of the first pixel electrode and the alignment restriction structures as viewed perpendicularly to the surfaces of the substrates.

12. The liquid crystal display device according to claim 11, wherein each of the auxiliary electrodes covers almost all of an associated one of the overlap regions.

13. The liquid crystal display device according to claim 10, further comprising a storage capacitor bus line disposed parallel with the gate bus lines, wherein the auxiliary electrodes are electrically connected to the storage capacitor bus line.

14. The liquid crystal display device according to claim 13, wherein the auxiliary electrodes are formed in the same layer as the storage capacitor bus line.

15. The liquid crystal display device according to claim 1, wherein the linear alignment restriction structures are bank-shaped resin structures.

16. The liquid crystal display device according to claim 1, further comprising a common electrode formed on the other substrate, wherein the linear alignment restriction structures are common-electrode-omitted portions.

17. A liquid crystal display device comprising:
a pair of substrates opposed to each other;
a liquid crystal sealed between the pair of substrates;
plural gate bus lines formed on one of the pair of substrates;
plural drain bus lines formed so as to cross the gate bus lines with an insulating film interposed in between;
plural pixel regions having a first pixel electrode formed on the one substrate and a second pixel electrode formed on the one substrate and separated from the first pixel electrode respectively;
a transistor disposed for each of the pixel regions and having a gate electrode which is electrically connected to an associated one of the gate bus lines, a drain electrode which is electrically connected to an associated one of the drain bus lines, and a source electrode which is electrically connected to the first pixel electrode;
a control capacitance portion which has a control capacitance electrode electrically connected to the source electrode and opposed to at least part of the second pixel electrode via an insulating film, and which thereby establishes capacitive coupling between the source electrode and the second pixel electrode; and
light shield plates disposed on the one substrate so as to occupy regions close to respective ends, opposed to the associated one of the drain bus lines, of the first pixel electrode, for shielding the regions close to the ends of the first pixel electrode from light; wherein
the light shield plates overlap with the first pixel electrode and do not overlap with the second pixel electrode.

18. The liquid crystal display device according to claim 17, further comprising a common electrode formed on the other substrate, wherein the light shield plates are kept at approximately the same potential as the common electrode.

19. The liquid crystal display device according to claim 17, further comprising a storage capacitor bus line disposed parallel with the gate bus lines, wherein the light shield plates are electrically connected to the storage capacitor bus line.

20. The liquid crystal display device according to claim 19, wherein the light shield plates are formed in the same layer as the storage capacitor bus line.

21. The liquid crystal display device according to claim 17, wherein the light shield plates are disposed so as to overlap with the ends, opposed to the associated drain bus line, of the first pixel electrode.

22. The liquid crystal display device according to claim 17, wherein an interval between the ends, opposed to the associated drain bus line, of the first pixel electrode and the associated drain bus line is shorter than an interval between ends, opposed to the associated drain bus line, of the second pixel electrode and the associated drain bus line.

23. The liquid crystal display device according to claim 17, further comprising a light shield film formed on the other substrate, for shielding an end portion of the pixel region from light, wherein an interval, as viewed perpendicularly to surfaces of the substrates, between an end of the light shield film and the associated drain bus line is shorter in regions corresponding to the light shield plates than that in other regions.

* * * * *